UNITED STATES PATENT OFFICE.

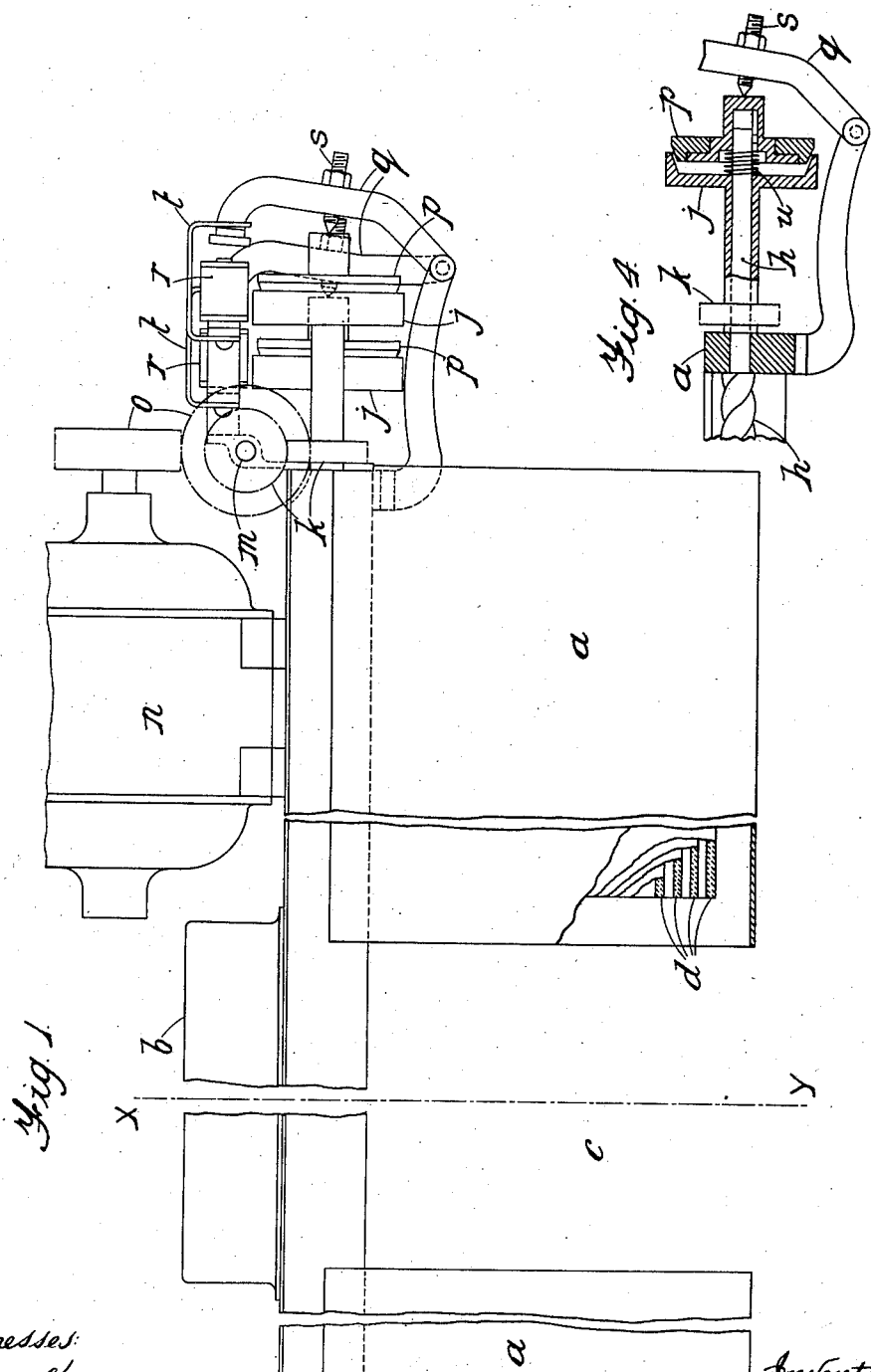

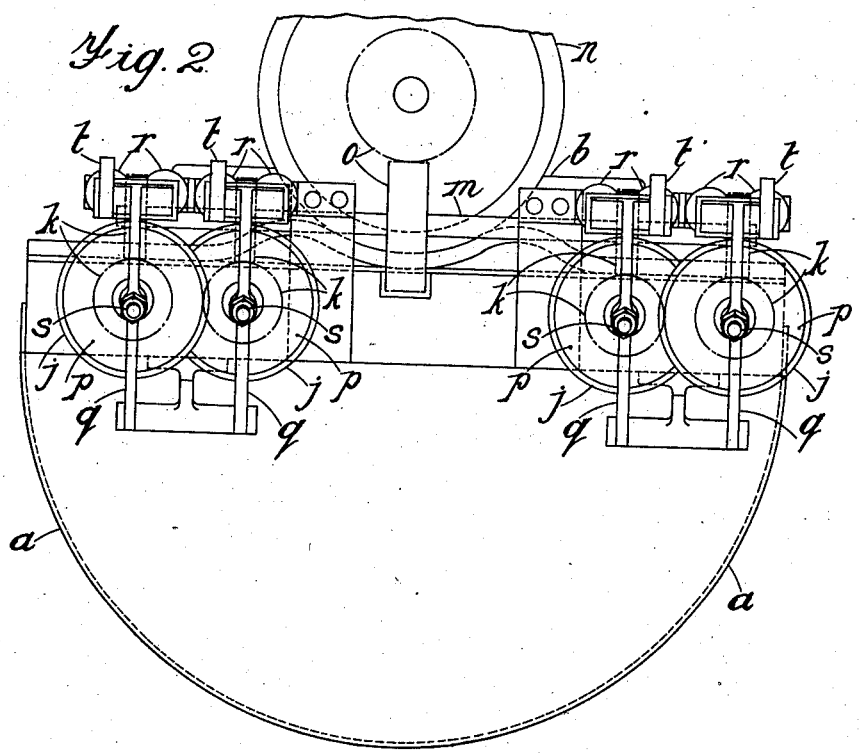
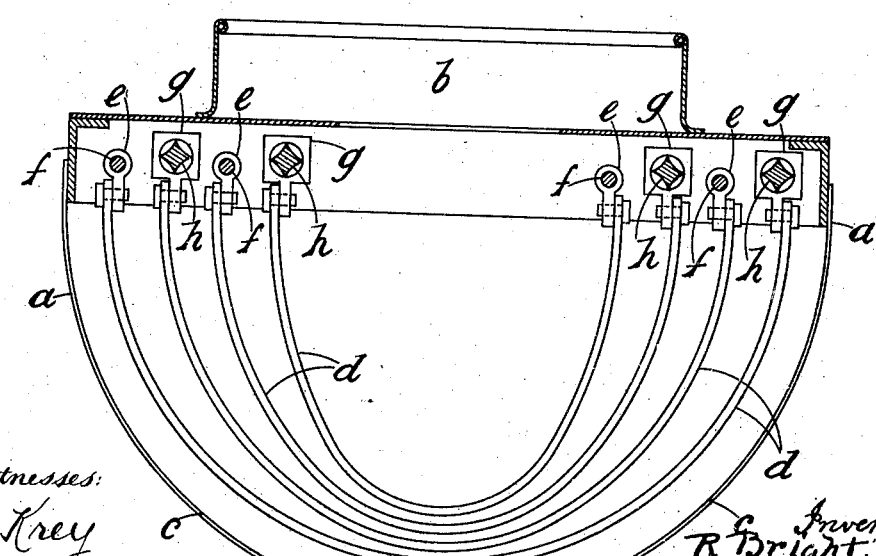

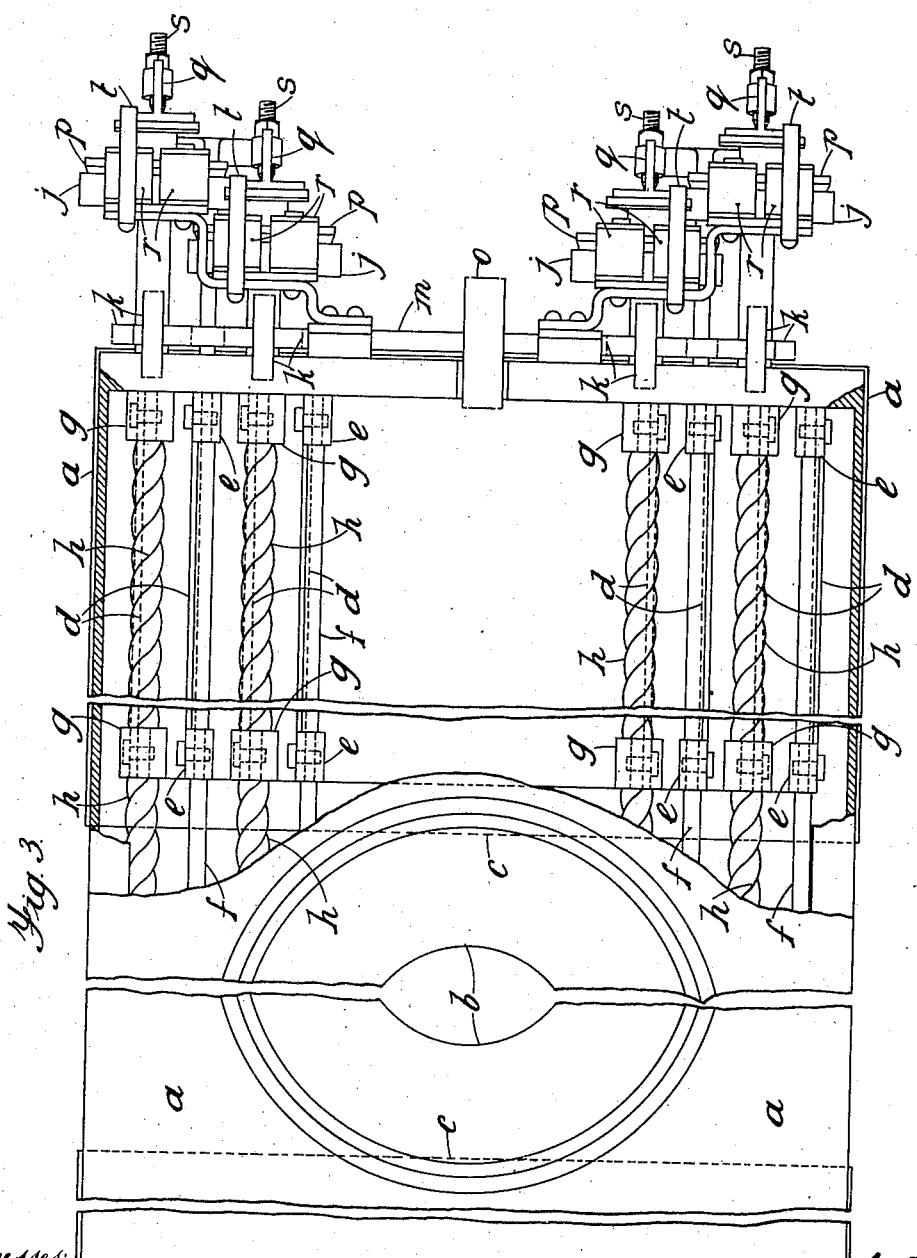

ROBERT BRIGHT, JR., OF ABERDEEN, SCOTLAND, AND JOHN MORICE WILSON WRIGHT, OF SUNDERLAND, ENGLAND.

PROJECTING-LANTERN.

1,026,019.  Specification of Letters Patent.  Patented May 14, 1912.

Application filed June 1, 1909. Serial No. 499,442.

*To all whom it may concern:*

Be it known that we, ROBERT BRIGHT, Jr., and JOHN MORICE WILSON WRIGHT, subjects of the King of Great Britain and Ireland, and residents of Aberdeen, Scotland, and Sunderland, England, respectively, have invented certain new and useful Improvements in Projecting-Lanterns, of which the following is a specification.

This invention relates to projecting lanterns or apparatus for producing scenic, signaling, advertising and other effects, and has special reference to apparatus of the kind wherein a number of screens of the desired colors or carrying the matter to be displayed are adapted to be traveled or moved in front and clear of the source of light as required, and it has for its object to provide improved simple and efficient means for operating the screens.

According to this invention, we employ a suitably driven shaft or member from which each screen is operated by suitable mechanism adapted to be rendered effective and ineffective by an electro-magnetic clutch.

We will fully describe our invention with reference to the accompanying drawings wherein—

Figure 1 is an elevation partly in section of a lantern embodying one form of our improvements, and Fig. 2 an end view of same. Fig. 3 is a plan of Fig. 1 partly in section, Fig. 4 is a part longitudinal section illustrating a detail, and Fig. 5 is a cross-section on the line X—Y in Fig. 1 looking to the right.

Referring to the drawings the lantern comprises a casing $a$ having an opening $b$ for the introduction of an electric arc lamp or other suitable source of light, and an aperture $c$ across which a number of screens $d$ are adapted to be traveled in front of the light. The screens $d$ are provided at one side with clips $e$ adapted to slide on rods $f$, and at the other side with nuts $g$ co-acting with screwed rods $h$ adapted to be rotated to travel the screens. On the end of an extension of each screwed rod $h$ we arrange a clutch the driving member $j$ of which is loosely mounted on the end of the rod $h$ and is rotated thereon by screw or other suitable gearing $k$ and a shaft $m$ driven by an electric motor $n$ through screw or other suitable gearing $o$. The driven member $p$ of the clutch is keyed to the end of the rod $h$ and is adapted to be slid thereon to engage the member $j$ by a pivoted arm $q$ adapted to be attracted by an electro-magnet $r$ when the latter is energized. The arm $q$ may be provided with an adjustable screw $s$ for engaging the clutch member $p$.

Normally the electro-magnets $r$ are not energized and the pivoted arms $q$ are supported by stops $t$ and the clutch members $p$ are kept out of engagement with the driving members $j$ by springs $u$ (Fig. 4). When a screen is to be operated the corresponding magnet $r$ is energized and attracts its arm $q$ which slides the clutch member $p$ on the end of the screwed rod $h$ of the screen into engagement with the driving member $j$, and, on the shaft $m$ being driven in the required direction by the motor $n$, the screwed rod $h$ is rotated to travel the screen. Thus it will be seen that any screen may be actuated at will by energizing the corresponding magnet and driving the motor in the required direction.

What we claim and desire to secure by Letters Patent is:—

1. In projecting lanterns the combination of a source of light, a screen, means for traveling said screen in front and clear of said source of light, and an electro-magnetic clutch for rendering said traveling means operative and inoperative.

2. In projecting lanterns the combination of a source of light, a plurality of screens, a screw-and-nut mechanism for traveling each of said screens in front and clear of said source of light, means for actuating said screw-and-nut mechanism, electro-magnetic clutches for putting said actuating means into and out of gear with any of said screw-and-nut mechanisms and means for selectively actuating said clutches.

In witness whereof, we have hereunto signed our names, in the presence of the subscribing witnesses.

ROBERT BRIGHT, JUNIOR.
JOHN MORICE WILSON WRIGHT.

Witnesses to the signature of Robert Bright, Junior:
CHARLES HERBERT DACRE CHELL,
HARRY LESLIE WHITTAKER.

Witnesses to the signature of John Morice Wilson Wright:
EDMUND WARD PATTISON,
H. NIXON.